United States Patent
Ichihara (10) Patent No.: US 10,476,890 B2
(45) Date of Patent: Nov. 12, 2019

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Hajime Ichihara, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 9 days.

(21) Appl. No.: 15/630,121

(22) Filed: Jun. 22, 2017

(65) Prior Publication Data
US 2018/0013766 A1 Jan. 11, 2018

(30) Foreign Application Priority Data
Jul. 8, 2016 (JP) .................................. 2016-136296

(51) Int. Cl.
*G06F 12/14* (2006.01)
*G06F 21/60* (2013.01)
*H04L 29/06* (2006.01)

(52) U.S. Cl.
CPC ........ *H04L 63/126* (2013.01); *G06F 12/1408* (2013.01); *G06F 21/602* (2013.01); *H04L 63/061* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 8,370,643 B2 | 2/2013 | Miyazaki et al. | |
| 9,264,410 B2* | 2/2016 | Dalbehera | ............ H04L 63/061 |
| 2013/0268753 A1* | 10/2013 | Vanderpol | ............ H04L 63/123 |
| | | | 713/155 |
| 2015/0180662 A1* | 6/2015 | Cui | ........................ H04L 9/0891 |
| | | | 713/176 |
| 2016/0234396 A1 | 8/2016 | Yasukawa | |

FOREIGN PATENT DOCUMENTS

| | | |
|---|---|---|
| JP | 2009089045 A | 4/2009 |
| JP | 2015097022 A | 5/2015 |

* cited by examiner

*Primary Examiner* — Christopher A Revak
(74) *Attorney, Agent, or Firm* — Rossi, Kimms & McDowell LLP (57) ABSTRACT

The information processing apparatus stores a cryptographic module and a key that the cryptographic module generated. The information processing apparatus determines whether or not the stored key is a key that a cryptographic module for which integrity is not verified generated. If so, the information processing apparatus updates the key determined to be the key that the cryptographic module for which integrity is not verified generated.

12 Claims, 8 Drawing Sheets

| KEY/CERTIFICATE NAME | KEY/CERTIFICATE USE DESTINATION | GENERATION SOURCE | GENERATED BY INTEGRITY VERIFIED CRYPTOGRAPHIC MODULE |
|---|---|---|---|
| Self-Key1 | SSL | INTERNAL | Yes |
| Default Key | | – | No |
| AMS | FOR ACCESS CONTROL | – | No |
| Device_Key1 | | EXTERNAL | – |
| Self-Key2 | | INTERNAL | No |
| Self-Key3 | | INTERNAL | No |

FIG. 8B

| KEY/CERTIFICATE NAME | KEY/CERTIFICATE USE DESTINATION | GENERATION SOURCE | GENERATED BY INTEGRITY VERIFIED CRYPTOGRAPHIC MODULE |
|---|---|---|---|
| Default Key | | – | No |
| AMS | FOR ACCESS CONTROL | – | No |
| Device_Key1 | | EXTERNAL | – |
| Self-Key2 | | INTERNAL | No |
| Self-Key3 | | INTERNAL | No |
| Device_Key2 | SSL | EXTERNAL | – |

810 { Device_Key2 row }

FIG. 8C

| KEY/CERTIFICATE NAME | KEY/CERTIFICATE USE DESTINATION | GENERATION SOURCE | GENERATED BY INTEGRITY VERIFIED CRYPTOGRAPHIC MODULE |
|---|---|---|---|
| Default Key | SSL | – | No |
| AMS | FOR ACCESS CONTROL | – | No |
| Device_Key1 | | EXTERNAL | – |
| Self-Key2 | | INTERNAL | No |
| Self-Key3 | | INTERNAL | No |

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

A wide variety of cryptography schemes are being developed, and these differ from each other in terms of characteristics and effects. Accordingly, there is a need to appropriately select encryption algorithms and functions of cryptographic modules in which these algorithms are implemented in independent modules. Also, even with sufficiently widespread and proven encryption algorithms and cryptographic modules that implement these, due to the discovery of vulnerabilities and increases in calculation capabilities of computers, there is a constant risk of attack and compromise.

While usage of highly reliable cryptographic modules enhances information processing and communication security, there are restrictions regarding calculation resources, required capabilities, and encryption schemes that communication partners can use, and so it is desirable that a user can make a selection while balancing risk and convenience when using these modules.

An information processing apparatus recited in Japanese Patent Laid-Open No. 2009-89045 incorporates a plurality of cryptographic modules, and based on functions, capabilities, and constraint condition evaluation information, an optimal cryptographic scheme or cryptographic module can be selected in accordance with the situation. Because there is the possibility of an attack such as a falsification of a cryptographic module, such an information processing apparatus confirms integrity by performing falsification detection when using a cryptographic module. In Japanese Patent Laid-Open No. 2015-97022 is recited a function for verifying a cryptographic module (hereinafter referred to as a cryptographic module verification function) by testing (known answer test) whether an expected value result is outputted in response to a specific input.

There are cases in which an information processing apparatus has a plurality of cryptographic modules, and one of these is a cryptographic module that performs high-reliability cryptography which has a verification function, and another is a cryptographic module that does not have a verification function. As described above, a user can switch which of the plurality of cryptographic modules to use by a setting, balancing risk and convenience. If the cryptographic module, among the plurality of cryptographic modules, that is currently being used in the information processing apparatus is a cryptographic module that does not verify integrity (a cryptographic module that does not have a verification function), there is a concern that the cryptographic module may be subject to a falsification attack. Accordingly, the reliability of a key or certificate generated using such a cryptographic module cannot be guaranteed. Accordingly, a case in which a cryptographic module used in an information processing apparatus is changed from a first cryptographic module that does not have a verification function to a second cryptographic module (for example, a module conforming to FIPS 140-2) that has a verification function is considered. In such a case, the reliability of communication and cryptographic processing will be impaired when a key or certificate generated by the first cryptographic module which does not have the verification function continues to be used, and the level of security that is expected out of the second cryptographic module which has the verification function cannot be guaranteed.

SUMMARY OF THE INVENTION

An aspect of the present invention is to eliminate the above-mentioned problems with the conventional techniques.

A feature of the present invention is to provide a technique in which the reliability of cryptographic processing and communication is ensured by updating a key/certificate that a cryptographic module that does not have an integrity verification function generated to a more reliable key/certificate.

According to a first aspect of the present invention, there is provided an information processing apparatus, comprising: a storage device that stores a key that a cryptographic module generated; a memory device that stores a set of instructions; and at least one processor that executes the instructions to: in a case where a setting to use a cryptographic module for which integrity is not verified is made with respect to the information processing apparatus, determine whether or not a key stored in the storage device is a key that a cryptographic module for which integrity is not verified generated; and in a case where a setting to use a cryptographic module for which integrity is verified is made with respect to the information processing apparatus, update the key determined to be the key that the cryptographic module for which integrity is not verified generated.

According to a second aspect of the present invention, there is provided a method of controlling an information processing apparatus having a storage device that stores a key that a cryptographic module generated, the method comprising: in a case when a setting to use a cryptographic module for which integrity is verified is made with respect to the information processing apparatus, determining whether or not a key stored in the storage device is a key that a cryptographic module for which integrity is not verified generated; and updating the key determined to be the key that the cryptographic module for which the integrity is not verified generated.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
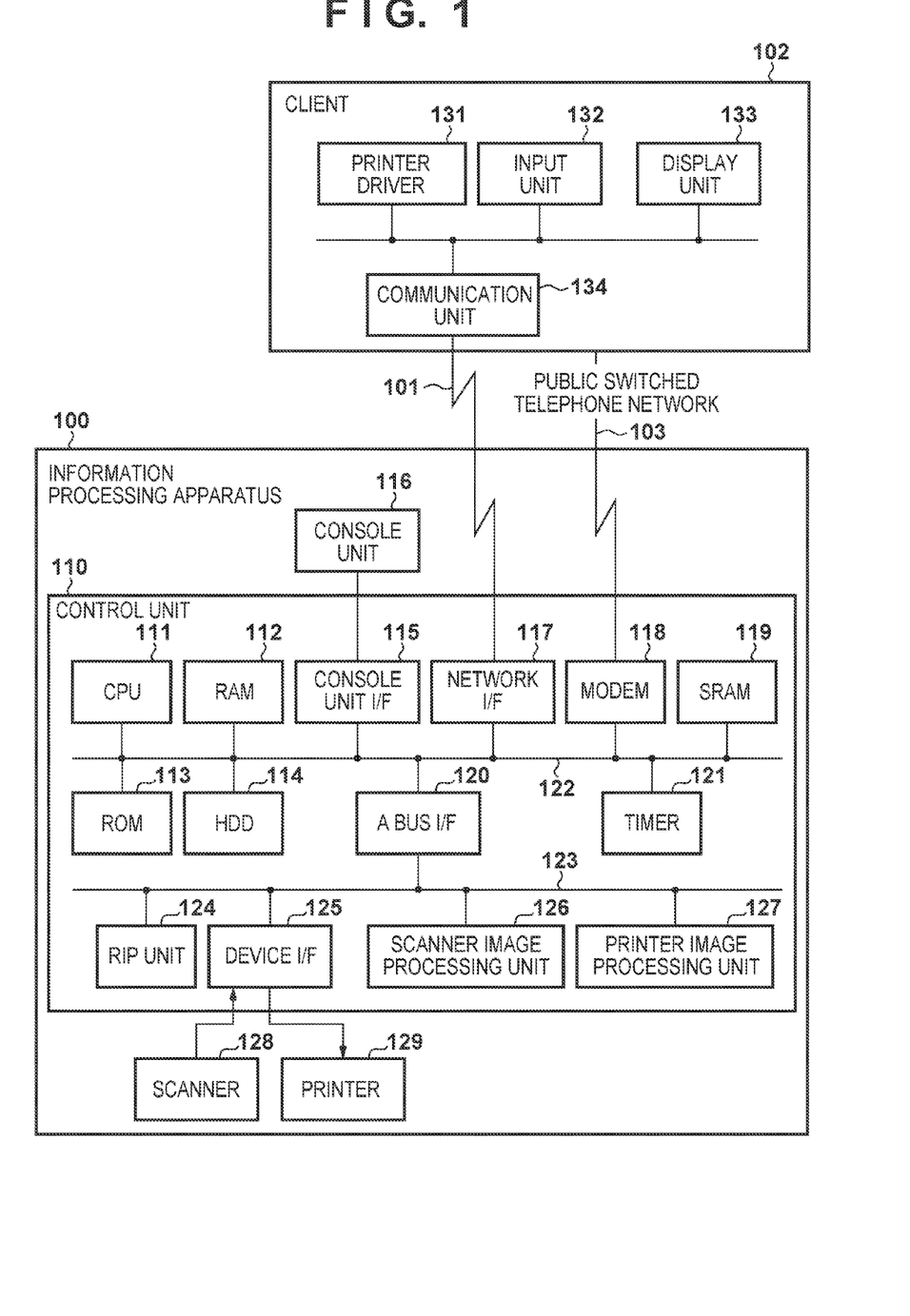
FIG. 1 depicts a view for describing a configuration of an information processing system according to an embodiment of the present invention.

FIG. 1 depicts a view for describing a configuration of an information processing system according to the embodiment of the present invention.

This information processing system comprises an information processing apparatus 100 (for example, a multifunction peripheral (MFP) or the like) connected to a network 101 and a client 102. The client 102, via the network 101, performs transmission/reception of data with the information processing apparatus 100, and performs various processing. Also, the information processing apparatus 100 and the client 102 may perform communication via a public switched telephone network 103. The information processing apparatus 100 is able to use a cryptographic module as a software function. The cryptographic module generates a key and a certificate, provides functions such as encryption/decryption processing for data of the information processing apparatus 100 and communication data, and signature generation/verification. Keys and certificates that the cryptographic module generates are stored in a storage apparatus such as a RAM 112 or an HDD 114, and are used in communication and cryptographic processing. Also, keys and certificates that can be used in such communication and cryptographic processing may be generated outside of the information processing apparatus 100, imported, and then used. Note the information processing apparatus 100 does not necessary comprise the configuration of an entire MFP, and configuration may be taken such that the information processing apparatus 100 functions as a control apparatus that is embedded in an MFP.

The information processing apparatus 100 comprises a control unit 110 that controls the entire apparatus, a scanner 128 which is an image input device, a printer 129 which is an image output device, and a console unit 116 which functions as a user interface.

The scanner 128, under the control of the control unit 110, reads an image (an original image) formed on an original, and generates image data representing the original image that is read in. The scanner 128 transmits generated image data to the control unit 110. The printer 129 performs image formation (printing) processing under the control of the control unit 110. The console unit 116 is an input output device comprising an input unit such as various key buttons, a touch panel, or the like, and a display unit such as a liquid crystal display. The console unit 116 transmits an instruction according to operation of a user on a key button or the touch panel to the control unit 110. Also, the console unit 116 displays an image on the display unit under the control of the control unit 110.

The control unit 110 comprises two buses: a system bus 122 and an image bus 123. The system bus 122 and the image bus 123 are able to communicate with each other via a bus interface 120. The control unit 110 comprises a CPU (Central Processing Unit) 111, the RAM (Random Access Memory) 112, and a ROM 113 (Read Only Memory) on the system bus 122. The CPU 111 controls operation of the information processing apparatus 100 by deploying a program stored in the ROM 113 into the RAM 112 and then executing the program. The RAM 112, in addition to being used as a work region, has a storage region for temporarily storing image data and data received from the console unit 116.

To the system bus 122, the HDD (Hard Disk Drive) 114, a console unit I/F 115, a network I/F 117, a modem 118, an SRAM (Static Random Access Memory) 119, and a timer 121 are also connected. All of the configuration elements connected to the system bus 122 can communicate with each other via the system bus 122.

The HDD 114 is a non-volatile storage device in which storage regions such as a cryptographic module storage region, a cryptographic module setting save region, a key/certificate storage region, a certificate information save region and the like are arranged. The cryptographic module storage region stores a cryptographic module used by the information processing apparatus 100. It is possible to store a plurality of cryptographic modules in the cryptographic module storage region. The cryptographic module setting save region stores cryptographic module setting information used continuously by the information processing apparatus 100. The key/certificate storage region stores keys and certificates used in communication and cryptographic processing. In the key/certificate storage region of the HDD 114 is stored information related to stored keys/certificates, for example management information indicating whether a cryptographic module that does not have a verification function that is internal to the information processing apparatus 100 is generated or a cryptographic module that does have the verification function is generated. Here, the verification function is a function in which the cryptographic module itself confirms whether the cryptographic module has been falsified. If the HDD 114 is a device that can store a large capacity in a non-volatile manner, it may be configured by another storage device such as a flash memory.

The console unit I/F 115 controls an interface with the console unit 116. The console unit I/F 115 obtains instructions transmitted from the console unit 116 and transmits them to the CPU 111. Also, the console unit I/F 115 transmit data representing an image displayed on the display unit of the console unit 116. The network I/F 117 performs communication control with another information processing apparatus via the network 101. In the present embodiment, the network I/F 117 performs communication control with the client 102 via the network 101. The modem 118 performs communication control with another information processing apparatus via the public switched telephone network 103. A facsimile communication by the modem 118 is possible. Also, in the present embodiment, the modem 118 can perform communication control with the client 102 via the network 101. The SRAM 119 is a volatile recording medium capable of high-speed operation, and stores various programs and various data. The timer 121 is, for example, an RTC (Real Time Clock), and measures the date and time even when power is not being supplied to the control unit 110.

The image bus 123 comprises an RIP (Raster Image Processor) unit 124, a device I/F 125, a scanner image processing unit 126, and a printer image processing unit 127. All of the configuration elements connected to the image bus 123 can communicate with each other via the image bus 123. The device I/F 125 is connected to the scanner 128 and the printer 129. The device I/F 125 obtains control signals from the CPU 111, and transmits the control signals to the scanner 128 and the printer 129. By this, the scanner 128 and the printer 129 perform operations according to the control signals. Also, the device I/F 125 supplies image data obtained from the scanner 128 into the control unit 110. The RIP unit 124 converts image data described in an image description language received from the client 102 into bitmap image data, for example. The scanner image processing unit 126 performs various image processing, such as correction, processing, or editing, on image data obtained from the scanner 128. The printer image processing unit 127 performs various image processing, such as correction, resolution conversion, or halftone processing, on image data representing an image to be formed on a recording material by the printer 129.

Next, the configuration of the client 102 is described. The client 102 comprises a CPU, a ROM, and a RAM (not shown). The CPU controls operation of the client 102 by executing a computer program read from the ROM using a work region of the RAM. The client 102 also comprises a printer driver 131, an input unit 132, a display unit 133, and a communication unit 134.

The communication unit 134 performs communication control with another information processing apparatus via the network 101. In the present embodiment, the communication unit 134 performs communication with the information processing apparatus 100 via the network 101. The printer driver 131 generates a print job that sets various conditions for image forming. A print job generated in this way is transmitted to the information processing apparatus 100 via the communication unit 134. The input unit 132 is an input device that includes, for example, a pointing device, a keyboard, and the like. Instructions inputted from the input unit 132 are sent to the CPU (not shown). The display unit 133 is a display apparatus such as a liquid crystal display, for example, and displays various images under the control of the CPU (not shown).

Figure 2:
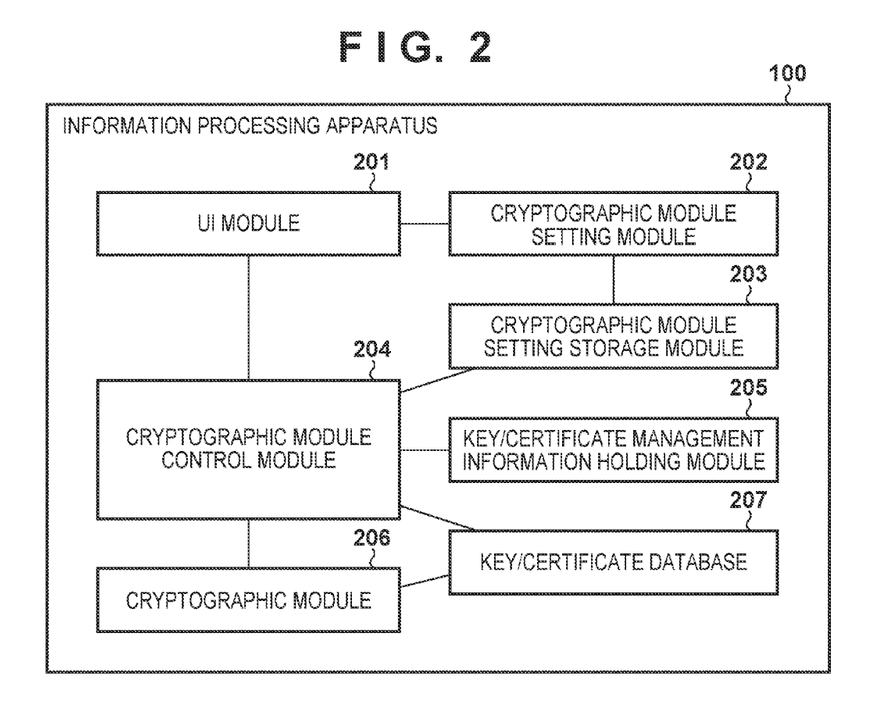
FIG. 2 is a block diagram for describing a software configuration of an information processing apparatus according to the embodiment.

FIG. 2 is a block diagram for describing a software configuration of the information processing apparatus 100 according to the embodiment. The information processing apparatus 100 has a user interface module 201 (hereinafter referred to as a UI module), a cryptographic module setting module 202, a cryptographic module setting storage module 203, a cryptographic module control module 204, and a key/certificate management information holding module 205. The information processing apparatus 100 further comprises a cryptographic module 206 and a key/certificate database 207.

The UI module 201 receives a request from a user via the console unit 116, and displays an operation screen on the console unit 116. The cryptographic module setting module 202 saves in the cryptographic module setting storage module 203 a setting (a cryptographic module selection setting) related to a selection of a cryptographic module that the information processing apparatus 100 uses. The cryptographic module setting storage module 203 holds settings related to cryptographic module execution and verification. The cryptographic module control module 204 is a predetermined functional unit for, based on the setting of the cryptographic module held in the cryptographic module setting storage module 203, verifying and executing the cryptographic module 206.

The cryptographic module setting module 202 determines the cryptographic module used by the information processing apparatus 100 in accordance with an instruction from the UI module 201, and saves setting information indicating the cryptographic module to be used in the cryptographic module setting storage module 203. The cryptographic module control module 204, based on the setting of the cryptographic module held in the cryptographic module setting storage module 203 at the time of activation of the information processing apparatus 100, instructs the cryptographic module 206 to execute the cryptographic module. The cryptographic module 206 can deploy into the RAM 112 or the SRAM 119 any of a plurality of cryptographic modules stored in a cryptographic module storage region of the HDD 114, and can execute the deployed cryptographic module.

The information processing apparatus 100, at a time of activation, deploys a cryptographic module stored in the HDD 114 into the RAM 112 or the SRAM 119. If the setting of the cryptographic module used at this time is a cryptographic module having a verification function, the cryptographic module control module 204 verifies that the cryptographic module of the HDD 114 has not been falsified prior to deploying the cryptographic module. That is, if a cryptographic module having the verification function is set as the cryptographic module to be used, the cryptographic module executes a verification process which verifies whether it has been falsified at the time of activation of the information processing apparatus 100. Also, after deploying from the HDD 114 to the RAM 112 or the SRAM 119 a cryptographic module for which a falsification verification has been completed, it is verified by a known answer test whether an expected result is outputted by cryptographic processing. The known answer test is a test for confirming whether a result of an expected value is outputted in response to specific input to the cryptographic module. Then, when the result of verification by the known answer test is that it is confirmed that there is no problem, execution of that cryptographic module is permitted. Meanwhile, if the verification result fails, it is determined that the integrity of the cryptographic module cannot be maintained, and execution of the cryptographic module is prohibited. In such a case, the information processing apparatus 100 ceases to be able to execute cryptographic processing, and a function for communication including cryptographic processing or the like completely ceases to operate. In the present embodiment, integrity means at least one of: that a cryptographic module is confirmed to not have been falsified or that it is confirmed that a predetermined result is outputted in response to predetermined input.

The cryptographic module setting module 202 can determine the cryptographic module to be used in accordance with setting by a user. For example, the user can set in the information processing apparatus 100 via the cryptographic module setting module 202 which cryptographic module to use, among a FIPS cryptographic module which has a verification function and a non-FIPS cryptographic module which does not have the verification function. A cryptographic module having the verification function is a cryptographic module for which the integrity of the cryptographic module is verified. Also, a cryptographic module that does not have the verification function is a cryptographic module for which the integrity of the cryptographic module is not verified. A FIPS cryptographic module is a module that conforms to FIPS 140-2, for example. Below, for convenience, a mode in which a FIPS cryptographic module having a verification function is set as the cryptographic module to be used is referred to as a FIPS mode. Also, a mode in which a non-FIPS cryptographic module that does not have a verification function is set as a cryptographic module to be used is referred to as a non-FIPS mode. Below, description is given of examples in which an FIPS cryptographic module and a non-FIPS cryptographic module are switched, but the present invention is not limited to this. Configuration may be taken such that it is possible to switch between a cryptographic module that does have a verification function and a cryptographic module that does not have a verification function. Alternatively, configuration may be taken such that within one cryptographic module, it is switched whether a verification function is enabled or disabled. In such a case, the cryptographic module in the state in which the verification function is enabled corresponds to the cryptographic module having the verification function, and the cryptographic module in the state in which the verification function is disabled corresponds to the cryptographic module that does not have the verification function.

A user can set so that the FIPS mode is enabled if the user desires to execute cryptographic processing using a high-reliability key and certificate. However, time is required for execution of the verification function. A user who wishes to shorten the time to activate the information processing apparatus 100 can set so that the FIPS mode is disabled and operation is carried out in the non-FIPS mode. Also, in order to guarantee security strength for the FIPS cryptographic module, the types of cryptographic algorithm that can be used are restricted, and only cryptographic algorithms having a high level of cryptographic strength are supported. If an application that operates in the information processing apparatus 100 is an application that can only use a cryptographic algorithm that the FIPS cryptographic module does not support, that application cannot operate in the FIPS mode. Similarly, there are cases in which a cryptographic algorithm that the apparatus of the communication partner that communicates with the information processing apparatus 100 uses is not supported in the FIPS cryptographic module. In such a case, there are case in which, when the FIPS mode is enabled, the application becomes unusable, or communication with a communication partner becomes impossible. In such a case, the user can set the FIPS mode to be disabled. When the verification function is set to disabled, a cryptographic module (non-FIPS cryptographic module) that does not have the verification function is selected as the cryptographic module. If a cryptographic module that does not have the verification function supports a cryptographic algorithm that the foregoing application or communication partner uses, the application can be allowed to operate, and communication can be performed with a communication partner.

The description of FIG. 2 is returned to. The key/certificate database 207 comprehensively manages and safely stores keys/certificates that a cryptographic module of the cryptographic module 206 generated, and keys/certificates that are generated in an external unit of the information processing apparatus 100 and installed, and configuration is such that these can be searched. The cryptographic module control module 204 registers a new key/certificate, and always uses the registered key/certificate via the key/certificate database 207. The key/certificate management information holding module 205 holds information (a certificate list) related to keys/certificates that are managed by the key/certificate database 207. The cryptographic module control module 204 can obtain from the key/certificate management information holding module 205 certificate list information in association with keys/certificates of the key/certificate database 207, and update information of the certificate list.

Figure 3:
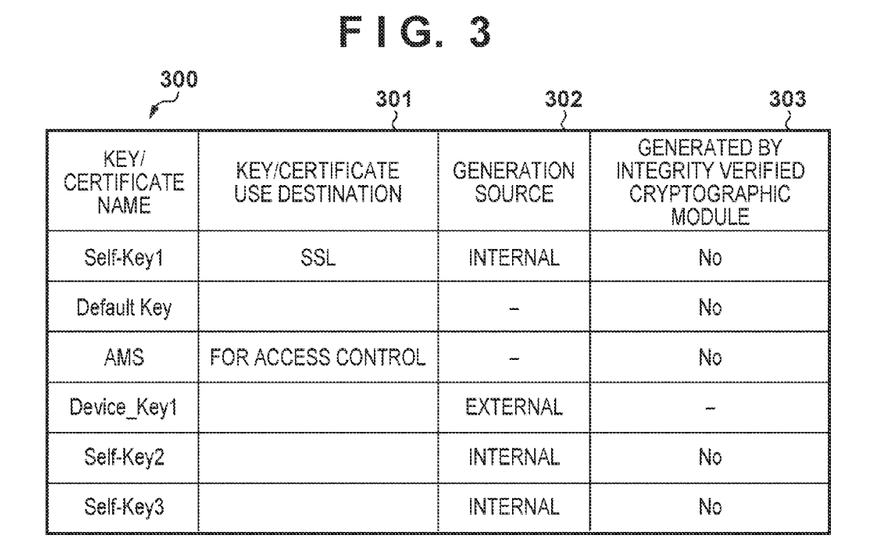
FIG. 3 depicts a view illustrating an example of information (a certificate list) related to keys/certificates stored in a key/certificate storage region of an HDD of the information processing apparatus according to the embodiment.

FIG. 3 depicts a view illustrating an example of information (a certificate list 300) related to keys/certificates stored in a key/certificate storage region of the HDD 114 of the information processing apparatus 100 according to the embodiment.

The certificate list 300 illustrates that keys/certificates are stored in the key/certificate storage region with names. In a "key/certificate use destination" column 301, the key/certificate use destination is recorded. The content of the "key/certificate use destination" column 301 can be changed by user setting. In a "generation source" column 302, "internal" is recorded if the key/certificate was generated by a cryptographic module internal to the information processing apparatus 100, and "external" is recorded if the key/certificate was generated externally and installed. Also, "–" is recorded if the key/certificate is initially installed in the information processing apparatus 100. In a "generated by an integrity verified cryptographic module" column 303, "Yes" is recorded in the case of a key/certificate that was generated by a cryptographic module that was verified by a cryptographic module verification function, and "No" is recorded in the case when it is not a key/certificate that was generated by a cryptographic module that was verified. For example, if the key/certificate was generated by a FIPS cryptographic module in the FIPS mode, "Yes" is recorded in the "generated by an integrity verified cryptographic module" column 303. Also, for example, if the key/certificate was generated by a non-FIPS cryptographic module in the non-FIPS mode, "No" is recorded in the "generated by an integrity verified cryptographic module" column 303. When the key/certificate was generated using the cryptographic module and when the key/certificate was installed from outside of the information processing apparatus 100, corresponding values are always stored in these columns 302 and 303.

Figure 4A:
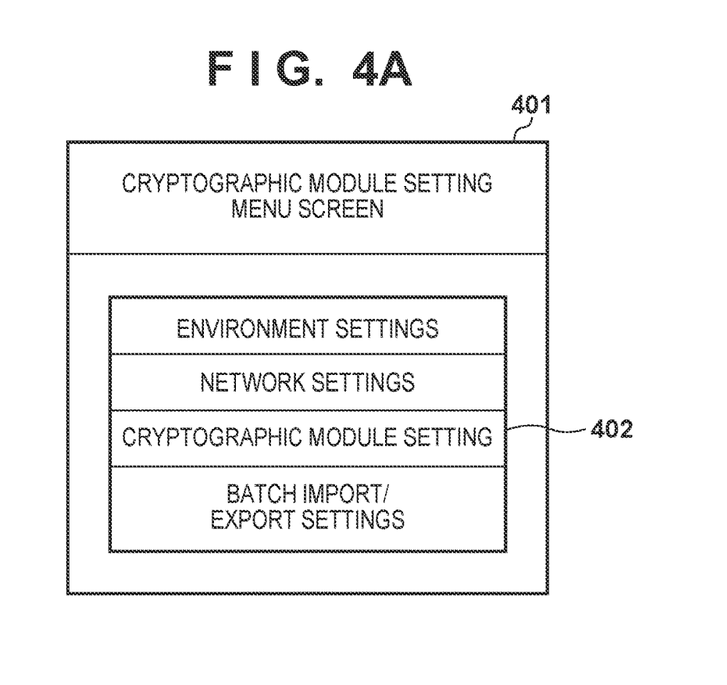
FIGS. 4A and 4B depict views illustrating examples of setting screens for when setting a cryptographic module in the information processing apparatus according to the embodiment.
Figure 4B:
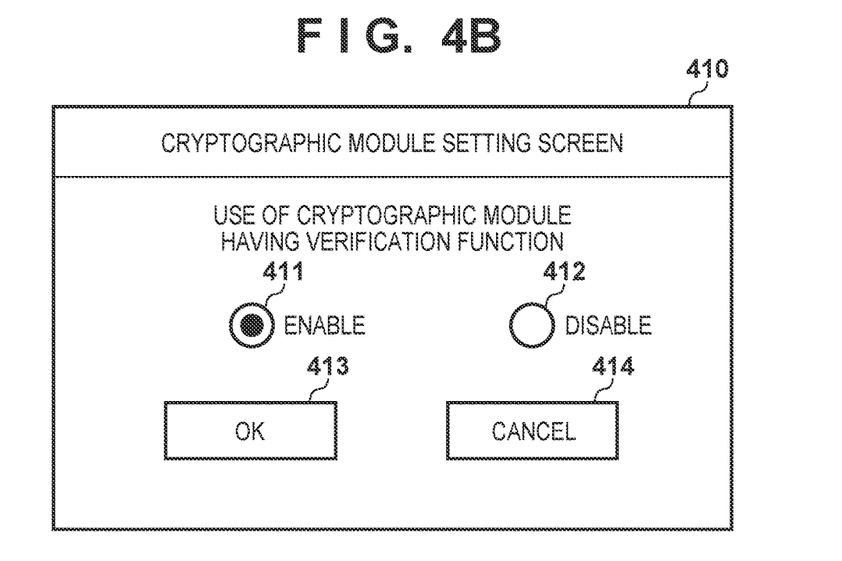

FIG. 4A and FIG. 4B depict views illustrating examples of setting screens for when setting a cryptographic module in the information processing apparatus 100 according to the embodiment.

In the present embodiment, these screens are displayed at a time of setting the cryptographic module on the console unit 116 of the information processing apparatus 100 or the display unit 133 of the client 102. When setting the cryptographic module, a cryptographic module setting menu screen 401 of FIG. 4A and a cryptographic module setting screen 410 of FIG. 4B are displayed.

The cryptographic module setting menu screen 401 is a screen displayed when performing cryptographic module settings. By selecting "cryptographic module setting" 402 of the cryptographic module setting menu screen 401, the cryptographic module setting becomes possible, and the cryptographic module setting screen 410 is displayed. The cryptographic module setting screen 410 is a screen for setting to disable or enable the use of a cryptographic module having the verification function. The cryptographic module setting screen 410 includes a radio button 411 for setting to enable use of the cryptographic module having the verification function, and a radio button 412 for disabling the use of the cryptographic module having the verification function. Also, an OK button 413 for finalizing the setting of this screen, and a cancel button 414 for cancelling the setting of this screen are included.

By a user selecting the radio button 411 (enable) of the cryptographic module setting screen 410 and pressing the OK button 413, the setting for using the cryptographic module having the verification function in the information processing apparatus 100 becomes enabled. The information processing apparatus 100 stores the cryptographic module setting information in the HDD 114 via the cryptographic module setting module 202 when the OK button 413 is pressed.

When the user changes the cryptographic module that is used, the CPU 111 always executes the later described key/certificate setting processing, and performs processing to update keys/certificates that the information processing apparatus 100 holds in accordance with the changed setting.

Figure 5:
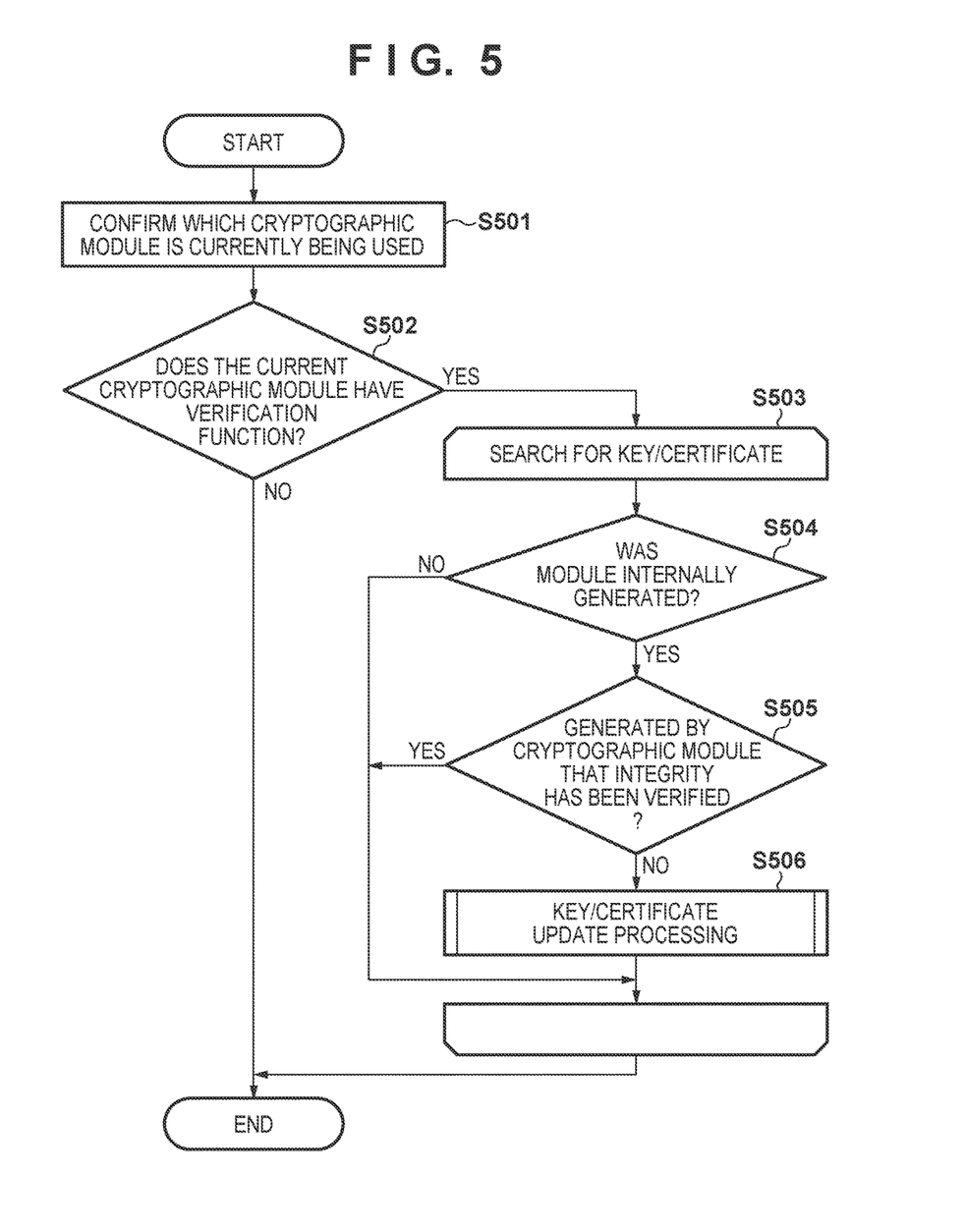
FIG. 5 is a flowchart for describing key/certificate setting processing according to the setting of the cryptographic module in the information processing apparatus according to an embodiment.

FIG. 5 is a flowchart for describing key/certificate setting processing according to the setting of the cryptographic module in the information processing apparatus 100 according to the embodiment. This setting processing is performed in a case when the cryptographic module setting is changed. Also, the processing illustrated by the flowchart is achieved by executing a program that the CPU 111 deployed into the RAM 112 from the ROM 113 or the HDD 114.

Firstly, in step S501, the CPU 111 obtains a setting as to whether or not to use a cryptographic module having the verification function from the HDD 114. This setting is set via the screen of FIG. 4B described previously. Next, the processing proceeds to step S502, and the CPU 111 determines whether or not use of the cryptographic module having the verification function is set to be enabled. When it is determined that the use of the cryptographic module having the verification function is disabled, the CPU 111 ends the key/certificate setting processing.

Meanwhile, when the CPU 111, in step S502, determines that use of the cryptographic module having the verification function is enabled, the CPU 111 advances the processing to step S503, and the CPU 111 searches for the key/certificate referencing the certificate list stored in the key/certificate storage region. Then the processing proceeds to step S504, and the CPU 111 references the "generation source" column 302 of the certificate list 300 of FIG. 3 to search for a key/certificate for which the column 302 is "internal", specifically a key/certificate that was generated within the information processing apparatus 100. When the CPU 111 detects, in step S504, a key/certificate generated within the information processing apparatus 100, the CPU 111 advances the processing to step S505 and references the "generated by an integrity verified cryptographic module" column 303 of the certificate list 300. Then, the CPU 111 determines whether or not the key/certificate is generated by a cryptographic module for which integrity has been verified. If the key/certificate was generated by a cryptographic module for which integrity was verified, specifically when the column 303 is determined to be "Yes", since it is not necessary to update the key/certificate, the searching of the certificate list 300 from step S503 is repeated. A cryptographic module for which integrity has been verified is a cryptographic module having a verification function. The cryptographic module having the verification function performs key or certificate generation in a state in which integrity is already verified because the verification process is executed at the time of activation.

Meanwhile, in step S505, if the key/certificate is not generated by a cryptographic module for which integrity has been verified, specifically when the column 303 is determined to be "No", the processing proceeds to step S506, and the CPU 111 executes key/certificate update processing described later with reference to FIGS. 6A and 6B. A key/certificate that is not generated by a cryptographic module for which integrity has been verified is a key or certificate generated by the cryptographic module that does not have the verification function. The cryptographic module that does not have a verification function is a cryptographic module that does not verify its own integrity.

Figure 6A:
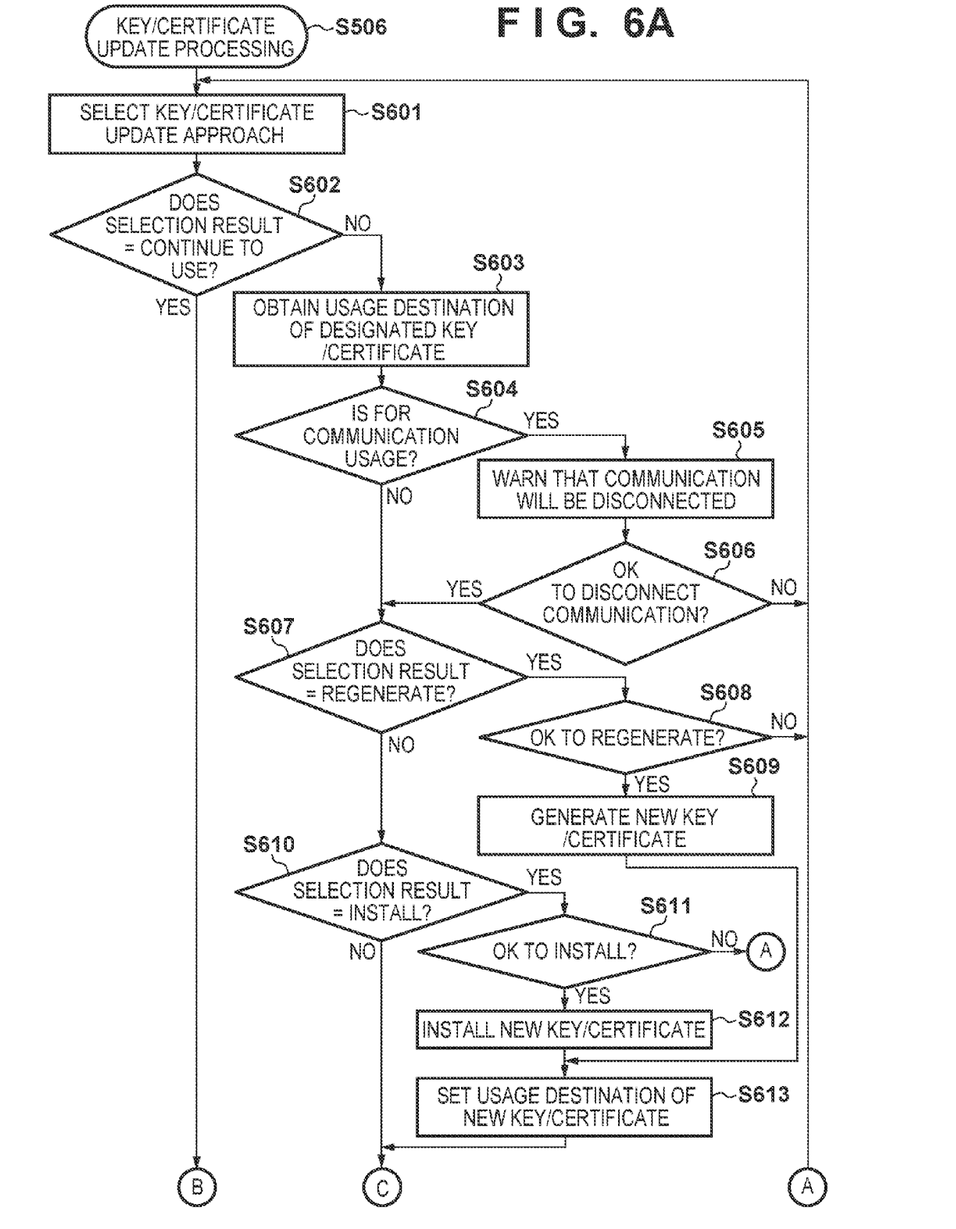
FIGS. 6A and 6B are flowcharts for describing key/certificate update processing of step S506 of FIG. 5.
Figure 6B:
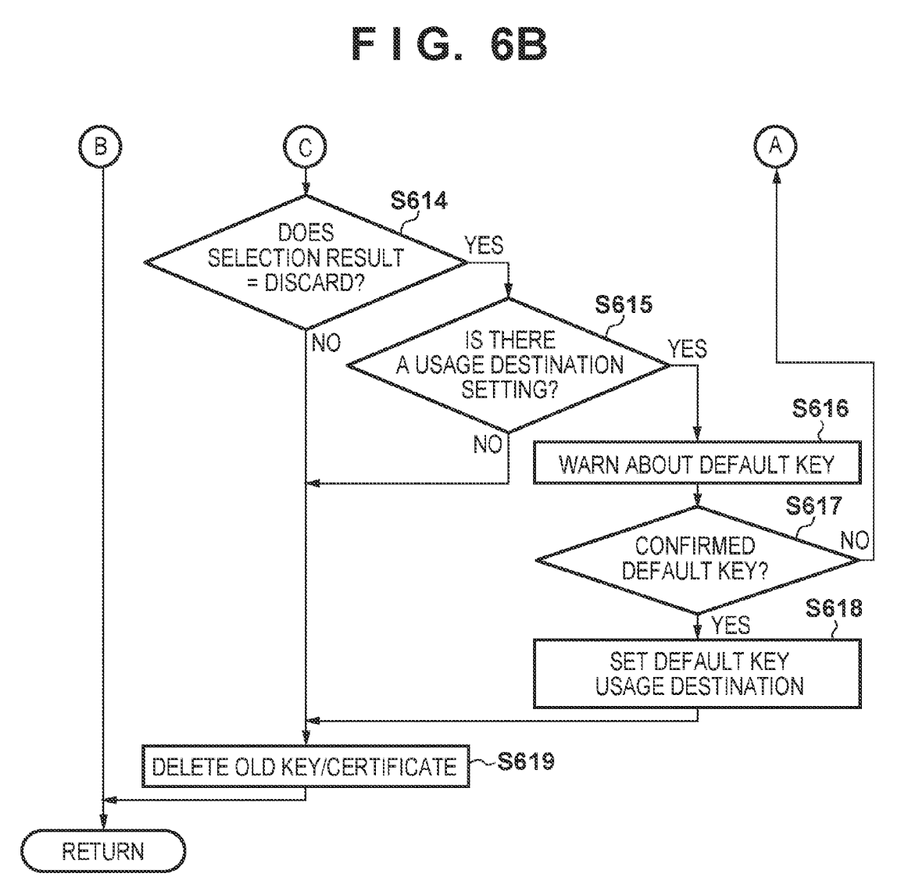

FIGS. 6A and 6B are flowcharts for describing key/certificate update processing of step S506 of FIG. 5. This processing is executed when the certificate list 300 is searched in the key/certificate setting processing of FIG. 5, and a key/certificate generated within the information processing apparatus 100 and generated by a cryptographic module that does not have the verification function is detected.

Prior to describing the flow of processing of FIGS. 6A and 6B, processing for performing setting related to updating a key/certificate is described with reference to FIG. 7A-FIG. 7E.

FIG. 7A-FIG. 7E depict views illustrating examples of key/certificate update setting screens displayed on the console unit 116 of the information processing apparatus 100 according to the embodiment.

Figure 7A:
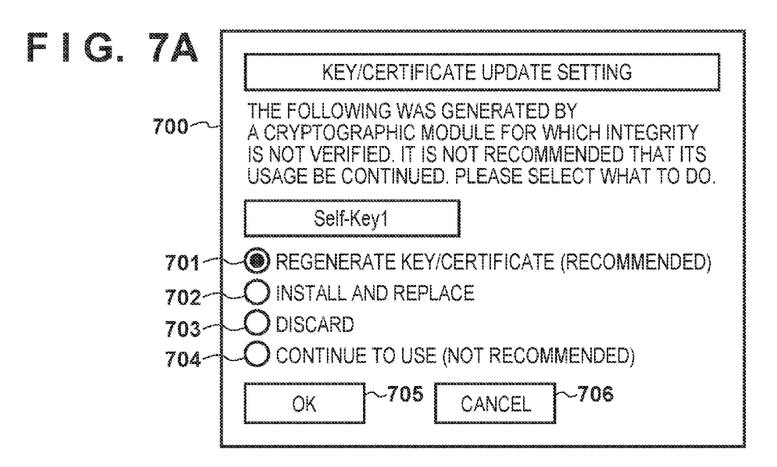
FIG. 7A-FIG. 7E depict views illustrating examples of key/certificate update setting screens displayed on a console unit of the information processing apparatus according to the embodiment.

An update setting screen 700 of FIG. 7A recommends discontinuing usage of a key/certificate (Self-Key1) of a cryptographic module for which integrity is not verified generated, and presents alternatives for updating it. A user can determine the key/certificate updating approach by selected one of the radio buttons 701-704. In FIG. 7A, "regenerate key/certificate (recommended)" of the button 701 is selected.

Figure 7B:
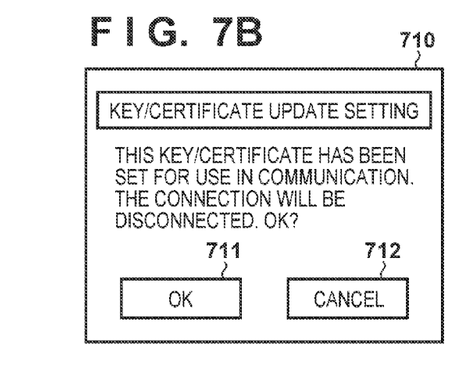

An update setting screen 710 of FIG. 7B is displayed when the key/certificate (Self-Key1) has been set for use in communication and it is set to discontinue usage of the key/certificate by something other than a button 704 being selected in FIG. 7A. Here, a warning is given that communication will be disconnected since that key/certificate cannot be used in communication.

Figure 7C:
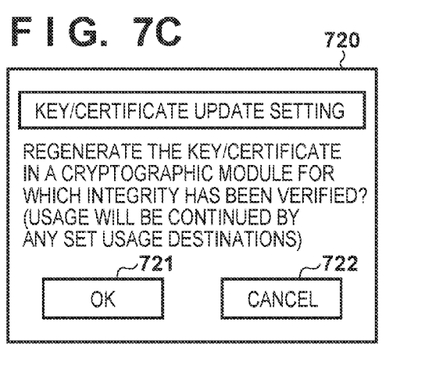

The update setting screen 720 of FIG. 7C is a screen for confirming with the user that the key/certificate (Self-Key1) will be regenerated in a cryptographic module for which integrity has been verified when the button 701 is selected in FIG. 7A.

Figure 7D:
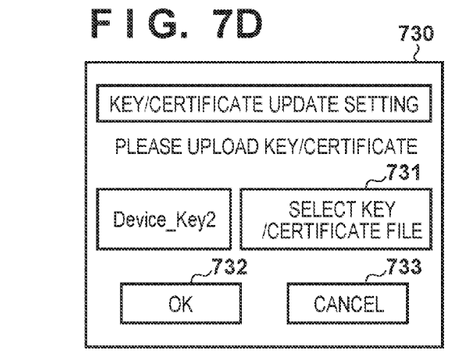

The update setting screen 730 of FIG. 7D is a screen for designating a file to upload when a button 702 is selected in FIG. 7A and a key/certificate that was generated externally is selected to be installed in place of the key/certificate (Self-Key1).

Figure 7E:
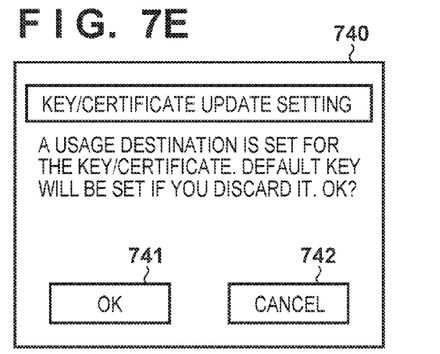

An update setting screen 740 of FIG. 7E is a screen for warning that "Default Key" is set when a button 703 is selected in FIG. 7A, and a usage destination of the key/certificate (Self-Key1) is determined, and the key/certificate is deleted.

Firstly, in step S601, the CPU 111 of the information processing apparatus 100 displays the update setting screen 700 exemplified in FIG. 7A on the console unit 116 in key/certificate update processing. The user selects one of the radio buttons 701-704 in the update setting screen 700 displayed on the console unit 116 to select the approach to updating the key/certificate. The console unit 116 transmits to the control unit 110 information related to the updating approach that the user selected. By this, the CPU 111 determines the key/certificate updating approach. Note that the key/certificate update processing need not comprise all of the later described alternatives, and may comprise a portion thereof in accordance with the functions of the information processing apparatus.

Next, in step S602, the CPU 111 determines whether or not the user selected the button 704 ("continue to use") among the radio buttons 701-704 of the update setting screen 700 of FIG. 7A. When "continue to use" is selected, the selected processing is continued, and so the original processing is returned to without executing update processing related to the key/certificate.

Meanwhile, if the user, in step S602, selected the radio button 701 ("regenerate key/certificate") of the update setting screen 700 of FIG. 7A, the processing proceeds to step S603 and the selected updating approach is not "continue to use". In step S603, the CPU 111 obtains information of a usage destination of the key/certificate from the certificate list 300, and holds it in the RAM 112 or the SRAM 119. Next, the processing proceeds to step S604, and the CPU 111 determines whether or not the usage destination of the key/certificate is communication usage, and if so, the processing proceeds to step S605, the setting screen 710 of FIG. 7B is displayed, and the warning that communication will be disconnected is given. Next, the processing proceeds to step S606, and when the CPU 111 determines that the user pressed the cancel button 712, the processing proceeds to step S601, and the initial processing for updating the key/certificate is returned to. Meanwhile, when it is determined in step S606 that the user pressed an OK button 711, the processing proceeds to step S607, and the processing continues as is.

If the updating approach that the user selected is "regenerate" in step S607, the processing proceeds to step S608, the setting screen 720 exemplified in FIG. 7C is displayed, and confirmation is made with the user that a new key/certificate will be generated. When it is determined that the user pressed a cancel button 722 of the setting screen 720, the initial processing for updating the key/certificate of step S601 is returned to. Meanwhile, when it is determined that the user pressed an OK button 721 of the setting screen 720, the processing proceeds to step S609, and the CPU 111 generates a new key/certificate using the cryptographic module for which integrity has been verified, and saves it in the HDD 114 through the key/certificate database 207. Then, the processing proceeds to step S613, and the CPU 111 registers in the certificate list 300 information of the name and usage destination of the new key/certificate held in the RAM 112 or the SRAM 119 as the name and usage destination of the new key/certificate. Then, the processing proceeds from step S614 to step S619, the original old key/certificate is deleted, and the processing returns from the process for updating the key/certificate to the key/certificate setting processing.

Figure 8A:
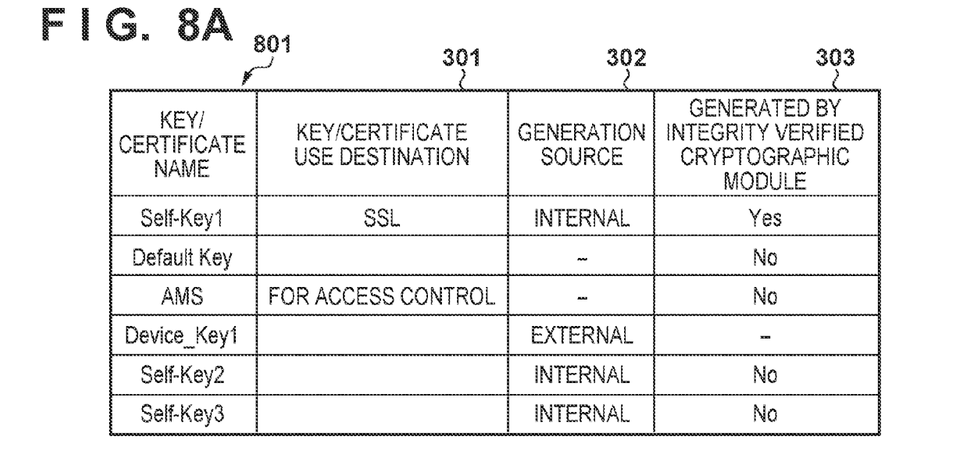
FIG. 8A-FIG. 8C depict views illustrating examples of results of the certificate list exemplified in FIG. 3 being changed by the information processing apparatus according to the embodiment executing key/certificate update processing.
Figure 8B:
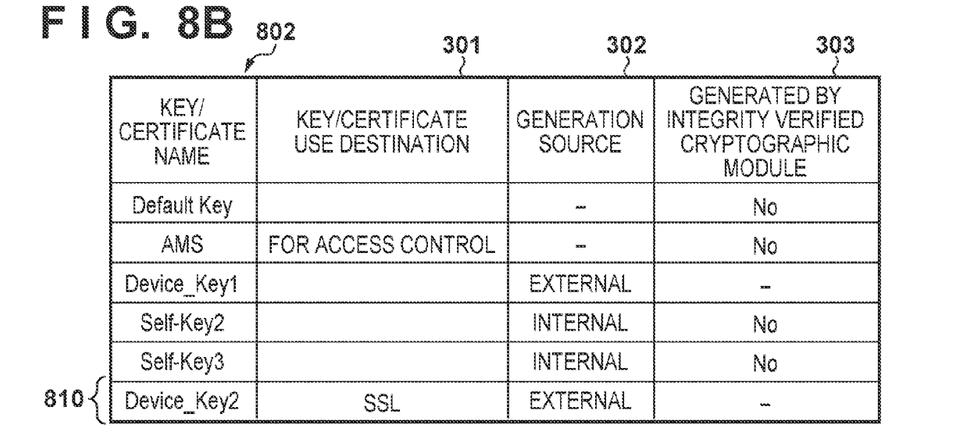
Figure 8C:
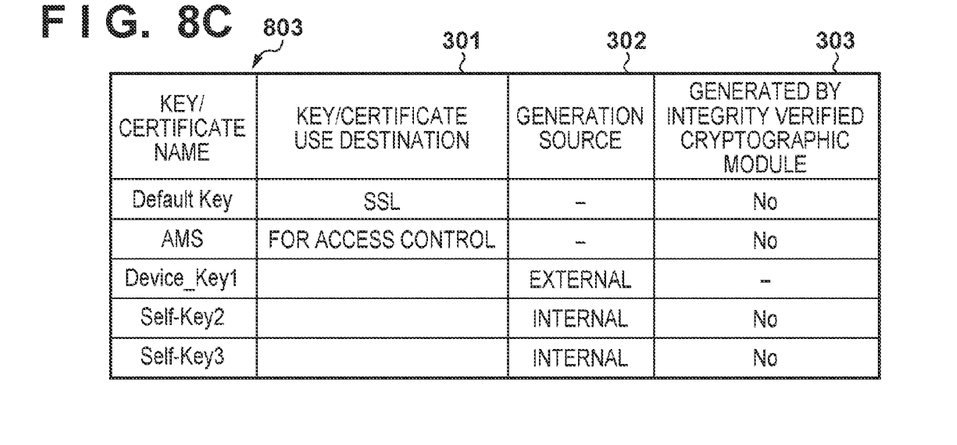

FIG. 8A-FIG. 8C depict views illustrating examples of results of the certificate list 300 exemplified in FIG. 3 being changed by the information processing apparatus 100 according to the embodiment executing key/certificate update processing.

FIG. 8A illustrates a case in which the key/certificate "Self-Key1" which is set for communication is regenerated. The "generated by an integrity verified cryptographic module" column 303 is updated to "Yes" as in a certificate list 801 of FIG. 8A. In this way, the key/certificate setting processing/update processing is completed. The new key/certificate, which is set for communication, is used during communication between the information processing apparatus 100 and the client 102.

By the foregoing processing, because a key/certificate used in cryptographic processing and communication is automatically updated to a high reliability key/certificate that is regenerated by a cryptographic module for which integrity has been verified, it is possible to realize more reliable cryptographic processing and communication. Also, because a key/certificate for which the reliability has not been guaranteed is deleted, it is possible to prevent a usage setting being made due to human error.

Also, if the user selects the radio button 702 ("install and replace") among the alternatives of the update setting screen 700 exemplified in FIG. 7A, processing equivalent to the processing (step S601-step S607) until the previously described key/certificate update processing communication disconnection confirmation is executed.

Here, because the processing that the user selected is "install and replace", the processing proceeds from step S607 to step S610, and the CPU 111 displays the setting screen 730 exemplified in FIG. 7D. In the screen 730, it is possible to select a new key/certificate file to be the target of installation when the user presses the "select key/certificate file" button 731. The key/certificate file selected here is something that is stored in the HDD 114 of the information processing apparatus 100 in advance. Alternatively, the user may select a key/certificate that an apparatus such as the client 102 that the information processing apparatus 100 can communicate with holds if the screen can be displayed and operated. If the user presses a cancel button 733 on the setting screen 730, the processing returns from step S611 to step S601. Meanwhile, when it is determined, in step S611, that the user pressed the OK button 732 on the setting screen 730, the processing proceeds to step S612, and the CPU 111 installs the selected new key/certificate and registers it in the key/certificate database 207. Then, the CPU 111, in step S613, registers information of the usage destination of the key/certificate held in the RAM 112 or the SRAM 119 in the certificate list 300 as the new key/certificate usage destination. Then, the processing proceeds from step S614 to step S619, and the CPU 111 deletes the original old key/certificate, and ends this processing.

A certificate list 802 of FIG. 8B is an example of results of the certificate list being changed by executing the foregoing update processing that installs the key/certificate.

The certificate list 802 of FIG. 8B illustrates a case in which installation is selected for the key/certificate "Self-Key1" of FIG. 3 which is set for communication. "Self-Key1" of FIG. 3 is deleted, and "Device_Key2" 810 is newly added, and the key/certificate usage destination column 301 is set to for communication (SSL). In this way, the key/certificate setting processing/update processing is completed. Also, "Device_Key2", having been set for communication in this way, is used at a time of communication between the information processing apparatus 100 and the client 102.

In the above explained processing, because keys/certificates used in cryptographic processing and communication are updated to keys/certificates intentionally prepared by a user, it is possible to prevent usage, in communication of a key/certificate that is generated by a cryptographic module for which integrity is not verified and for which reliability is not guaranteed, from being continued. By this, it is possible for a user to select to use a more reliable key/certificate. Also, because a key/certificate for which the reliability is not been guaranteed is deleted, it is possible to prevent a usage setting being made due to human error.

Also, if a user selected a radio button 703 ("discard") in the update setting screen 700 exemplified in FIG. 7A, processing that is equivalent to the foregoing processing (step S601 to step S606) is executed. Here, the selected processing is for discarding, and so the processing proceeds through step S607, step S610, step S614, and step S615, and the CPU 111 determines, in step S615, whether or not the usage destination of the key/certificate held in the RAM 112 or the SRAM 119 in step S603 is set. If it is determined that the usage destination has been set in step S615, the processing proceeds to step S616, the CPU 111 displays the update setting screen 740 exemplified in FIG. 7E, and confirms with the user that "Default Key" will be applied. This "Default Key" is a key/certificate installed in the information processing apparatus 100 in advance.

Next, when the CPU 111, in step S617, determines that the user pressed the cancel button 742 of the setting screen 740, the processing proceeds to step S601. Meanwhile, when in step S617, it is determined that the user pressed the OK button 741 of the setting screen 740, the processing proceeds to step S618. Then, the CPU 111, in step S618, registers information of the usage destination of the key/certificate held in the RAM 112 or the SRAM 119 in the certificate list 300 as the usage destination of the "Default Key". Then, the processing proceeds to step S619, and the CPU 111 deletes the original key/certificate, and ends this processing.

A certificate list 803 of FIG. 8C is an example of a result of the certificate list 300 exemplified in FIG. 3 being changed by executing update processing when "discard" (radio button 703) is selected.

The key/certificate "Self-Key1" set for communication in FIG. 3 is discarded, and the usage destination of "Default Key" is set to communication (SSL) usage. In this way, the key/certificate setting processing/update processing completes. Also, "Default Key", having been set for communication in this way, is used at a time of communication between the information processing apparatus 100 and the client 102.

According to the embodiment described above, a key/certificate used for cryptographic processing and communication is updated to a key/certificate registered in advance in the information processing apparatus. Accordingly, it is possible to prevent usage of a key/certificate that was generated by a cryptographic module for which integrity is not verified and for which reliability is not been guaranteed being continued in communication.

Also, it is possible to avoid a situation in which encrypted communication ceases to be possible due to discarding the key/certificate. Also, because a key/certificate for which the reliability is not been guaranteed is deleted, it is possible to prevent a setting for using such a key/certificate being made due to human error.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-136296, filed Jul. 8, 2016, which is hereby incorporated by reference herein in its entirety.

What is claimed is:

1. An information processing apparatus, comprising:
   a storage device that stores one or more keys that one or more cryptographic modules generated;
   a memory device that stores a set of instructions; and
   at least one processor that executes the instructions to:
   determine, in a case where a setting to use a cryptographic module having an integrity verification function, in which the cryptographic module itself confirms whether the cryptographic module has been falsified, is made with respect to the information processing apparatus, whether or not one or more keys generated by a cryptographic module having an integrity verification function in which the cryptographic module itself confirms whether the cryptographic module has been falsified are stored in the storage device; and
   update, according to a determination that a key generated by the cryptographic module having the integrity verification function in which the cryptographic module itself confirms whether the cryptographic module has been falsified is not stored in the storage device, the one or more keys stored in the storage device such that the updated one or more keys stored in the storage device are keys generated by a cryptographic module having an integrity verification function in which the cryptographic module itself confirms whether the cryptographic module has been falsified.

2. The information processing apparatus according to claim 1, wherein the at least one processor executes instructions in the memory device to:
   perform cryptographic processing by executing the cryptographic module having the integrity verification function or the cryptographic module not having the integrity verification function.

3. The information processing apparatus according to claim 1, wherein the at least one processor executes instructions in the memory device to:
   set whether or not to use the cryptographic module having the integrity verification function.

4. The information processing apparatus according to claim 1, wherein the at least one processor executes instructions in the memory device to:
  display on a display unit a screen for allowing a user to select an approach to updating the one ore more keys that were generated by the cryptographic module not having the integrity verification function; and
  update the one or more keys in accordance with a selection by a user via the screen.

5. The information processing apparatus according to claim 4, wherein the approach to updating includes using the cryptographic module having the integrity verification function to regenerate one or more keys in place of the one or more keys that were generated by the cryptographic module not having the integrity verification function.

6. The information processing apparatus according to claim 4, wherein the approach to updating includes discarding the one or more keys that were generated by the cryptographic module not having the integrity verification function.

7. The information processing apparatus according to claim 4, wherein the approach to updating includes installing one or more keys in place of the one or more keys that were generated by the cryptographic module not having the integrity verification function.

8. The information processing apparatus according to claim 1, wherein the at least one processor executes instructions in the memory device to:
  after updating the one or more keys, discard the one or more keys that were generated by the cryptographic module not having the integrity verification function.

9. The information processing apparatus according to claim 1, wherein the storage device stores information indicating a generation source of the one or more keys, and the determination is performed with respect to one or more keys that the stored information indicates were generated in the information processing apparatus.

10. The information processing apparatus according to claim 1, wherein the at least one processor executes instructions in the memory device to:
  in a case where one or more keys set to be used for communication are to be updated, warn a user that communication will be disconnected.

11. A method of controlling an information processing apparatus having a storage device that stores one or more keys that one or more cryptographic modules generated, the method comprising:
  determining, in a case where a setting to use a cryptographic module having an integrity verification function, in which the cryptographic module itself confirms whether the cryptographic module has been falsified, is made with respect to the information processing apparatus, whether or not one or more keys generated by a cryptographic module haing an integrity verification function in which the cryptographic module itself confirms whether the cryptographic module has been falsified are stored in the storage device; and
  updating, according to a determination that the a key generated by the cryptographic module having the integrity verification function in which the cryptographic module itself confirms whether the cryptographic module has been falsified is not stored in the storage device, the one or more keys stored in the storage device such that the updated one or more keys stored in the storage device are keys generated by a cryptographic module having an integrity verification function in which the cryptographic module itself confirms whether the cryptographic module has been falsified.

12. A non-transitory computer-readable storage medium storing a program for causing a processor to execute a method of controlling an information processing apparatus having a storage device that stores one or more keys that one or more cryptographic modules generated, the method comprising:
  determining, in a case where a setting to use a cryptographic module having an integrity verification function, in which the cryptographic module itself confirms whether the cryptographic module has been falsified, is made with respect to the information processing apparatus, whether or not one or more keys generated by a cryptographic module having an integrity verification function in which the cryptographic module itself confirms whether the cryptographic module has been falsified are stored in the storage device of the information processing apparatus; and
  updating, according to a determination that a key generated by the cryptographic module having the integrity verification function in which the cryptographic module itself confirms whether the cryptographic module has been falsified is not stored in the storage device, the one or more keys stored in the storage device such that the updated one or more keys stored in the storage device are keys generated by a cryptographic module having an integrity verification function in which the cryptographic module itself confirms whether the cryptographic module has been falsified.

* * * * *